US007424443B2

(12) United States Patent
Yanagisawa et al.

(10) Patent No.: US 7,424,443 B2
(45) Date of Patent: Sep. 9, 2008

(54) POS SYSTEM FOR ADVERTISEMENTS PRINTED ON RECEIPTS

(75) Inventors: Noboru Yanagisawa, Suwa (JP); Masahiro Minowa, Suwa (JP); Teruaki Oguchi, Suwa (JP); Asahiro Oguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 29 days.

(21) Appl. No.: 10/981,414

(22) Filed: Nov. 4, 2004

(65) Prior Publication Data

US 2005/0096988 A1    May 5, 2005

Related U.S. Application Data

(62) Division of application No. 09/521,472, filed on Mar. 8, 2000, now Pat. No. 6,961,710.

(30) Foreign Application Priority Data

Mar. 10, 1999   (JP)   ............................. 11-063532
Mar. 3, 2000    (JP)   ............................. 2000-059227

(51) Int. Cl.
G06Q 20/00    (2006.01)
(52) U.S. Cl. ...................... 705/16; 705/14; 705/26
(58) Field of Classification Search .................. 705/14, 705/15, 16, 17, 18, 21, 24, 26, 27, 28, 29
See application file for complete search history.

(56) References Cited

U.S. PATENT DOCUMENTS

| 4,723,794 | A |   | 2/1988  | Shannon          |         |
|-----------|---|---|---------|------------------|---------|
| 4,817,949 | A |   | 4/1989  | Backman et al.   |         |
| 4,972,328 | A | * | 11/1990 | Wu et al.        | 706/59  |
| 5,413,341 | A |   | 5/1995  | Lieberman        |         |
| 5,592,611 | A |   | 1/1997  | Midgely et al.   |         |
| 5,612,527 | A | * | 3/1997  | Ovadia           | 235/383 |

(Continued)

FOREIGN PATENT DOCUMENTS

JP    05-182077    7/1993

(Continued)

OTHER PUBLICATIONS

The Bank Credit Card Business, 2nd Edition, American Bankers Association, 1996.*

(Continued)

*Primary Examiner*—Matthew S. Gart
*Assistant Examiner*—M. Thein
(74) *Attorney, Agent, or Firm*—Mark P. Watson

(57) ABSTRACT

Advertising information input control module of a POS system receives advertising information, and a billing amount calculating module calculates a billing amount based on advertising information received by input control module. A payment confirming module confirms payment of the billing amount calculated by the billing amount calculating module, and an advertising information storing control module stores the advertising information in a storing device. A check-out information input control module receives input of customer check-out information, and an advertising information retrieving module retrieves the advertising information stored in the storing device. A printing data generating module synthesizes or combines check-out information with the advertising information so as to generate printing data, which is output at a printing device, and printed as a receipt with an ad.

8 Claims, 16 Drawing Sheets

U.S. PATENT DOCUMENTS

| | | | |
|---|---|---|---|
| 5,724,521 A | 3/1998 | Dedrick | |
| 5,752,238 A | 5/1998 | Dedrick | |
| 5,819,241 A | 10/1998 | Reiter | |
| 5,819,665 A | 10/1998 | McCormick | |
| 5,825,884 A | 10/1998 | Zdepski et al. | |
| 5,845,262 A | 12/1998 | Nozue et al. | |
| 5,848,397 A * | 12/1998 | Marsh et al. | 705/14 |
| 5,868,236 A | 2/1999 | Rademacher | |
| 5,887,903 A | 3/1999 | Schreadley, Jr. | |
| 5,930,810 A * | 7/1999 | Farros et al. | 715/506 |
| 5,970,469 A | 10/1999 | Scroggie et al. | |
| 5,978,013 A * | 11/1999 | Jones et al. | 725/23 |
| 6,064,994 A * | 5/2000 | Kubatzki et al. | 705/410 |
| 6,120,062 A | 9/2000 | Revill | |
| 6,138,569 A | 10/2000 | McCormick | |
| 6,141,654 A * | 10/2000 | Heiden et al. | 705/408 |
| 6,167,382 A * | 12/2000 | Sparks et al. | 705/26 |
| 6,216,112 B1 * | 4/2001 | Fuller et al. | 705/14 |
| 6,219,692 B1 | 4/2001 | Stiles | |
| 6,223,209 B1 | 4/2001 | Watson | |
| 6,233,564 B1 | 5/2001 | Schulze, Jr. | |
| 6,267,670 B1 | 7/2001 | Walker et al. | |
| 6,298,329 B1 | 10/2001 | Walker et al. | |
| 6,298,348 B1 * | 10/2001 | Eldering | 705/36 R |
| 6,298,373 B1 | 10/2001 | Burns et al. | |
| 6,334,109 B1 | 12/2001 | Kanevsky et al. | |
| 6,366,918 B1 * | 4/2002 | Guttman et al. | 707/100 |
| 6,370,580 B2 | 4/2002 | Kriegsman | |
| 6,401,074 B1 * | 6/2002 | Sleeper | 705/14 |
| 6,460,763 B1 | 10/2002 | Yoshinaga et al. | |
| 6,487,538 B1 * | 11/2002 | Gupta et al. | 705/14 |
| 6,533,168 B1 | 3/2003 | Ching | |
| 6,550,683 B1 | 4/2003 | Augustine | |
| 6,820,062 B1 * | 11/2004 | Gupta et al. | 705/16 |
| 6,829,587 B2 * | 12/2004 | Stone et al. | 705/26 |
| D500,810 S * | 1/2005 | Osigwe et al. | D20/37 |
| 6,876,974 B1 * | 4/2005 | Marsh et al. | 705/14 |
| 6,891,635 B2 * | 5/2005 | Dutta | 358/1.15 |
| 6,961,710 B1 * | 11/2005 | Yanagisawa et al. | 705/24 |
| 6,973,436 B1 * | 12/2005 | Shkedi | 705/14 |
| 2002/0010757 A1 * | 1/2002 | Granik et al. | 709/218 |
| 2002/0161648 A1 * | 10/2002 | Mason et al. | 705/14 |
| 2003/0088463 A1 | 5/2003 | Kanevsky et al. | |

FOREIGN PATENT DOCUMENTS

| | | |
|---|---|---|
| JP | 7-85164 | 3/1995 |
| JP | 7-177494 | 7/1995 |
| JP | 8-161636 | 6/1996 |
| JP | 8-235441 | 9/1996 |
| JP | 8-279079 | 10/1996 |
| JP | 08-315252 | 11/1996 |
| JP | 9-23243 | 1/1997 |
| JP | 9-81863 | 3/1997 |
| JP | 9-147235 | 6/1997 |
| JP | 10-091868 | 4/1998 |
| JP | 10-134253 | 5/1998 |
| JP | 10-198864 | 7/1998 |
| JP | 10-214383 | 9/1998 |
| JP | 3054031 | 9/1998 |
| JP | 11-052900 | 2/1999 |
| JP | 11-219481 | 8/1999 |
| JP | 11-232552 | 8/1999 |
| JP | 2000-137754 | 5/2000 |
| WO | WO 91/06913 | 5/1991 |

OTHER PUBLICATIONS

Bragg, Steven M., Accounting Best Practices, John Wiley and Sons, Inc., 1999.*
Smith, Catherine P., Retail Banking Technology, International Business Communications, Limited, 1987.*
Egner, Floyd E. III, The Electronic Future of Banking, Financial Sourcebooks, Inc., Napersville, IL, 1991.*
White, Ron, How Computers Work Millennium Ed. Que Corporation, Sep. 1999.
Derfler, Frank J. et al. How Networks Work, Millenium Ed., Que Corporation, Jan. 2000.
Gralla, Preston, How the Internet Works, Millennium Ed., Que Corporation, Aug. 1999.

* cited by examiner

901

INPUT YOUR TARGET GROUP. WHEN COMPLETED, PRESS "NEXT".
PRESS THE ☐ TO TARGET. CHECKED ☑ TARGETS WILL RECEIVE ADS.

AGE GROUP
- 903a ☐ UP TO 9 YEARS OLD
- 903b ☑ 10'S
- 903c ☑ 20'S
- 903d ☑ 30'S
- 903e ☑ 40'S
- 903f ☐ 50 AND ABOVE

SEX
- 902a ☑ MALE
- 902b ☑ FEMALE

OCCUPATION
- 904a ☑ JUVENILE
- 904b ☐ COLLEGE STUDENT
- 904c ☐ OUT OF SCHOOL
- 904d ☐ ALL

BACK | NEXT

```
CONVENIENCE STORE      MARUI SHOTEN

PHONE   03-3769-0466

14:20, MARCH 1, 1999
┌─────────────────────────────────────┐
│ NOTICE OF UPCOMIG BAZAAR            │
│                                     │
│   THERE WILL BE A BAZAAR AT         │
│   THE GYM OF THE CHIYODA            │
│   ELEMENTARY SCHOOL ON              │
│   MARCH 13, FROM 10 AM.             │
│   PLEASE PARTICIPATE.               │
└─────────────────────────────────────┘

J9001  BREAD        x 1  @150    ¥150
J8254  ERASER       x 1  @50      ¥50
J2304  CUP NOODLES  x 2  @110    ¥220
SUBTOTAL                         ¥420
CONSUMPTION TAX                   ¥21
TOTAL                            ¥441
RECEIVED                       ¥1,000
CHANGE                         ¥5 5 6

THANK YOU
```

POS SYSTEM FOR ADVERTISEMENTS PRINTED ON RECEIPTS

CONTINUING APPLICATION DATA

This application is a divisional of U.S. patent application Ser. No. 09/521,472 filed Mar. 8, 2000, the contents of which are incorporated herein by reference.

BACKGROUND OF THE INVENTION

1. Field of the Invention

The present invention relates to a Point-Of-Sale (POS) system and a printed advertisement billing method. It particularly is directed to a POS system, printed advertisement billing method, and information recording medium, in which an advertiser, who seeks to have his/her advertisement printed on receipts generated at a check-out counter, for example, is billed according to the type, amount and duration of running the advertisement. In the event the advertising customer pays the advertising costs, the advertisement is printed on the receipt of store customers.

2. Description of the Related Art

POS systems in which customer check-out information (e.g. items/cost) is printed as a receipt have been in widespread use in convenience stores, supermarkets, and the like. With such a POS system, the operator uses a bar-code reader such as a hand scanner to read the bar-code on a product label attached to the product. The price of the product that has been stored separately in a storing device (memory) is retrieved based on the product identification information contained in the read bar-code, and cost calculations are performed according to such price information. Finally, the item and cost information is printed as a receipt. At this time, the operator may input information about the customer such as age, gender, occupation, etc., which is used to determine buying trends. Such information is helpful in planning for inventory requirements.

Convenience stores, kiosks, and the like can also be used to perform services such as reserving or ordering tickets, such as concert tickets, compact disks, and other such products or services. In such case, information input terminals, which are operated by customers inputting information through a liquid-crystal panel equipped with a touch panel are also in widespread use. The customer selects a desired product or ticket from the information input terminal, and receives the ticket/product stub printed by the information input terminal. A bar-code is printed on this stub, and the ticket or product is paid for at the check-out counter by reading this bar-code with the POS system.

Also, convenience stores and the like each receive information regarding various local events, such as field days, bazaars, sporting events etc., and use this information to plan for inventory needs.

Also, as reported in Page 39 of the Jan. 26, 1999 issue of the Nikkan Kogyo Shimbun newspaper, a POS system has been proposed wherein information available from the Internet or other various commercial information-providing services can be printed on the receipt according to the preferences of the customer. Such systems are arranged such that the information is provided free of charge, or such that the customer who is provided with the information pays for receiving such information.

Further, a POS system has also been proposed wherein such information is displayed on a line display (customer display) provided with a cash register.

However, in the case of using such a POS system for advertising, complicated procedures have to be followed to place ads by registering with the Internet or other various commercial information-providing services. Accordingly, conventional POS systems can not readily deal with local residents, for example, placing ads in their residential area, for example. Thus, the information printed on the receipt is only generic information such as weather forecasts or the news of the day, and hence is not serving as a channel for active exchange of information between local residents.

However, there is a demand for a facility for local residents to be able to actively participate in the use of present POS systems to disseminate information about various events being held by the local residents.

Also, convenience stores and the like are facilities that are widely used by local residents, and there is a great demand for convenience stores and the like to be useful as channels of information exchange.

Also, local residents providing the convenience stores with information regarding such various events would aid the stores in inventory planning.

Further, a system is desired in which the advertising cost is a function of the type of advertisement. This would allow school events with a public benefit to be placed free, while charging profit-oriented ads such as ads for private tutors or seminars.

OBJECTS OF THE INVENTION

Accordingly, an object of the present invention is to address the needs and problems identified in prior systems. It is a further object of the present invention to provide a POS system, printed advertisement billing method, and information recording medium, in which an advertiser, who seeks to have his/her advertisement printed on receipts generated at a check-out counter, for example, is billed according to the type, amount and duration of running the advertisement. In the event the advertising customer pays the advertising costs, the advertisement is printed on the receipt of store customers

SUMMARY OF THE INVENTION

To this end, in accordance with the principles of the present invention, the POS system according to the present invention comprises an advertising information input controller or control means, billing amount calculator or calculating means, payment confirming unit or means, and advertising information storing device or means, wherein the advertising information input controller or control means receives as an input advertisement information; the billing amount calculator or calculating means calculates the billing amount based on the advertising information received by the input controller or control means; the payment confirming unit or means confirms payment of the billing amount calculated by the billing amount calculator or calculating means; and the advertising information storing device or means stores the advertising information received by the input controller or control means such that it can be later read, with the storing occurring at the time that payment of the billing amount has been confirmed.

Further, the advertisement information that is received by the advertising input control means or controller may include a period for running the advertisement. The advertisement information may also include characteristics of an advertisement recipient, including gender, age or occupation. Also, the advertising information may include the printing size of the ad.

In addition, the billing amount calculator or calculating means may calculate the billing amount based on advertising information including at least one of a period for running an advertisement, a printing size of an advertisement, and one of an advertisement recipient's gender, age, or occupation.

Further, the POS system according to the present invention may further comprise an input device, a display device, and a storage device, and wherein the display device displays an advertisement in a size that is the same as a printing size of the advertisement.

Also, the POS system according to the present invention further may comprise an image input controller or control means, and wherein the advertising information input controller or control means receives the input image information as part or all of the advertising information.

Also, the POS system according to the present invention further may comprise a customer information input controller or control means, advertising information retrieving unit or means, and printing data generator or generating means, wherein the customer information input controller or control means receives as an input information regarding customers;

the advertising information retrieving unit or means retrieves advertising information stored in the storing device or means; and the printing data generator or generating means synthesizes the customer information received by the customer information input controller or control means with the advertising information retrieved by the advertising information retrieving unit or means, generates printing data to be printed as a receipt, and sends this printing data to a printing device, with the printing device printing this data as a receipt.

Also, the customer information input controller or control means of the POS system according to the present invention also may receive as an input customer information; and the advertising information retrieving unit or means may select and retrieve from advertising information stored in the storing device, based on the customer information.

Also, the customer information that can be input to the customer information input controller or control means of the POS system according to the present invention may be one or all of a customer's age group, gender, and occupation.

The present invention also includes an advertisement billing method with features commensurate with the apparatus as described above The method of the present invention may be embodied in a software program and stored on a media readable by a computer or machine for executing the program. Such recording media may include compact disks, floppy disks, hard disks, optical-magnetic disks, digital video disks, magnetic tape, semiconductor memory, and so forth.

Further, the software program for controlling the POS system according to the present invention may be resident in WWW (World Wide Web) server computers, from which an operator may download the program over the Internet for storage in the POS system and to update resident programs, thereby allowing the POS system to execute the method of the present invention as embodied in the software programs.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts:

FIG. 10 is a display example of the input menu for the certain conditions displayed on the information input terminal of the POS system shown in FIG. 1;

FIG. 16 is an explanatory diagram illustrating a printout example of a receipt output by the POS system shown in FIG. 1.

DESCRIPTION OF THE PREFERRED EMBODIMENTS

Figure 1:
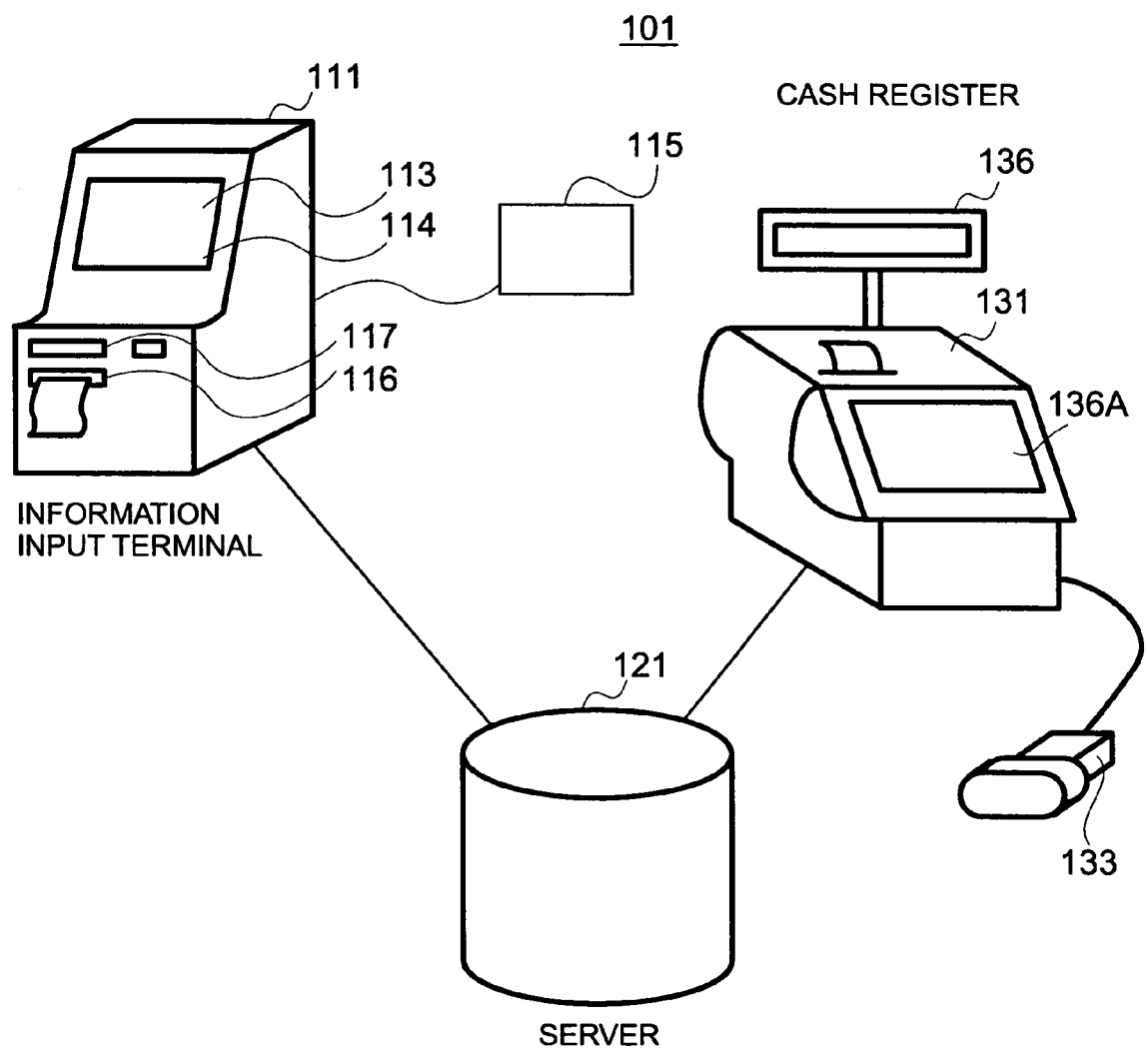
FIG. 1 is a block diagram illustrating an overview of an embodiment of the POS system according to the present invention.

The following is a description of an embodiment of the present invention. It should be noted that the embodiment described below is for description purposes, and by no means restricts the scope of the present invention. Accordingly, individuals skilled in the art are capable of employing embodiments thereof with individual components or all components replaced with equivalent components, and such embodiments are also encompassed in the scope of the present invention.

It should be noted that though the embodiment shown in the drawings and described with reference thereto below is an arrangement designed for use in Japan, such exemplary description does not restrict the present invention in any way.

A description of the overall configuration of the POS system follows.

FIG. 1 shows a block diagram of an embodiment of the POS system according to the present invention.

Figure 4:
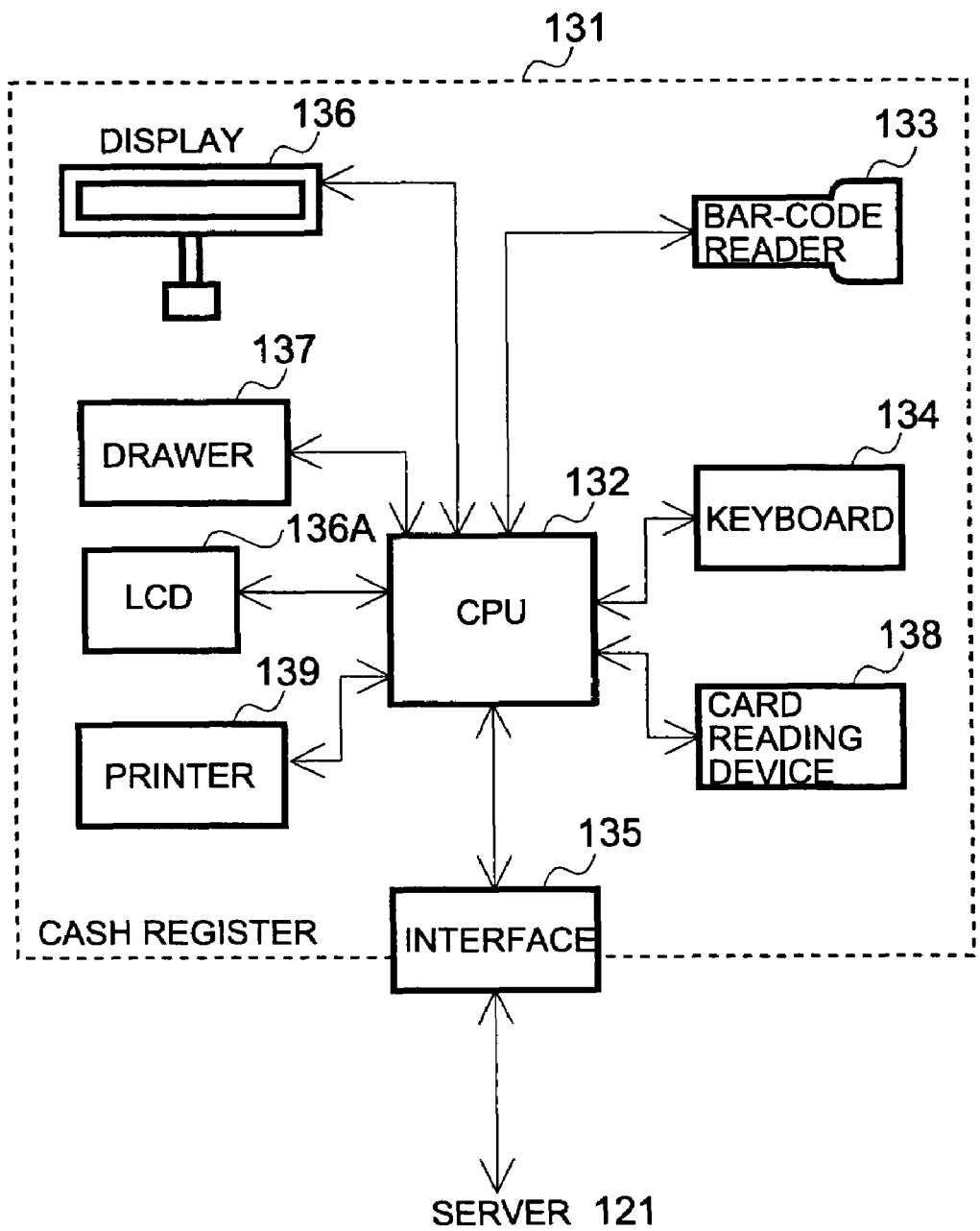
FIG. 4 is a block diagram illustrating the configuration of the cash register of the POS system shown in FIG. 1.

The POS system 101 comprises an information input terminal 111, which may be located at a kiosk, for example, a server computer 121, which may be remotely located from the kiosk terminal 111, and a cash register/terminal 131, which may be located at the kiosk or at a separate convenience store. With reference to FIG. 4, the cash register 131 comprises a keyboard 134 and bar-code reader 133 as input devices thereof, a liquid crystal display 136A and customer display 136 as display devices thereof, and a receipt printer 139 or the like as a printing device thereof.

Figure 2:
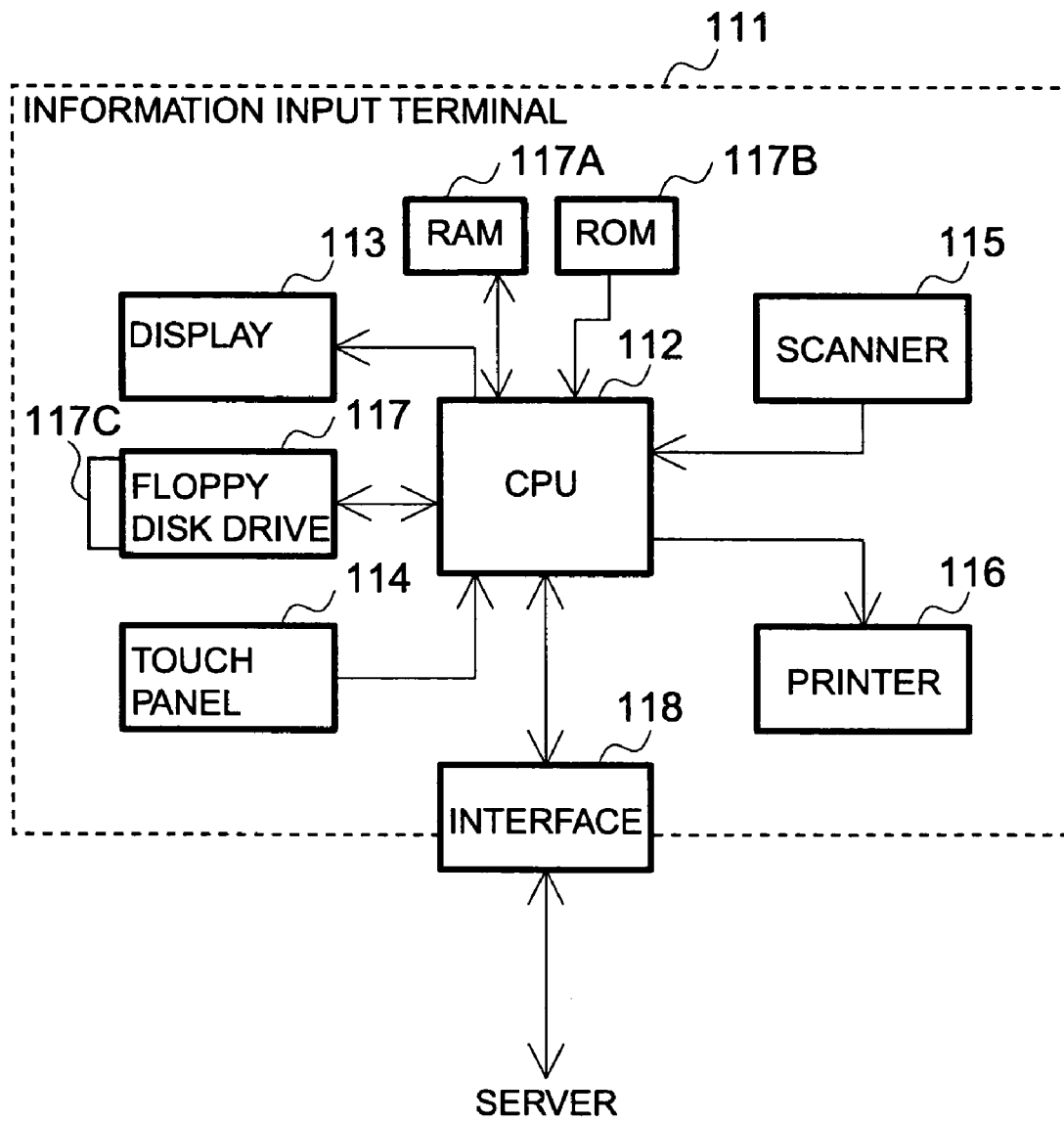
FIG. 2 is a block diagram illustrating the configuration of the information input terminal of the POS system shown in FIG. 1.

With reference to FIGS. 1 and 2, the information input or kiosk terminal 111 comprises a liquid crystal display 113 as a display device thereof, a touch panel 114, a floppy disk drive 117, and an image scanner 115 as input devices thereof, and a printer 116 as a printing device thereof. The printer 116 is an ink-jet printer capable of multi-color printing.

The customer who is to provide the information (i.e., the customer who is to place the ad) inputs the advertising information that he/she desires to be placed on the receipts through the information input terminal 111. At this time, the advertising customer may specify the target audience of his/her advertisement. Particular characteristics such as gender, age group, occupation, etc., for the individuals who are to receive the receipts printed with the ad can be selected and input.

The server 121 stores the advertising information input from the information input terminal 111 and also the specified characteristics corresponding to the desired target audience associated with the particular advertising information. Also, the server can further function to store the prices of products and keep track of inventory, if provided with a product database.

Input of the customer information as well as product information purchased by the customer who is going to receive a receipt with printed advertising is performed at the cash register 131. The cash register operator inputs into the cash register 131 information regarding the age group, gender, occupation, etc. of the customer who is to receive the ad, and also reads the bar-codes attached to the products with the bar-code reader 133, and inputs the number of products from the keyboard.

Check-out calculations are performed at the cash register 131 based on the product identification information read with the bar-code reader 133, and the number of products input by the operator. The check-out calculations may be performed at the cash register 131, or at the server 121. Also, a product database stored in the server 121 can be used to check the price of products from the identification information thereof.

Thus, according to the present invention, the information input terminal 111 can be used to supply to the cash register 131 advertising information provided by local residents (advertising customers placing ads) in an independent and interactive manner. It also aids in the exchange of information within a neighborhood or local area since specific advertising information can be printed on the receipt of the specific types of customers purchasing products in accordance with the customer profile input by the cashier operator and specified by the advertiser.

The configuration of the information input terminal is described as follows.

FIG. 2 is a block diagram of the information input terminal 111 of the POS system shown in FIG. 1.

The components of the information input terminal 111 are controlled by the CPU 112. Information input buttons, query table (alphabet keyboard) for character input, etc., are displayed on the liquid crystal display 113, so that the desired items can be selected from the displayed buttons or query tables by pressing a touch panel 114 provided on the liquid crystal display 113, thus allowing advertising information to be input. Also, the present invention may include a handwriting recognition area provided on the touch panel and a character recognition program installed in the information input terminal to recognize the handwriting, whereby hiragana, katakana, kanji or an English alphabet can be directly input.

Also, a liquid crystal display 113 of the present invention includes dedicated input buttons, selectable input fields, drop-down fields, etc. for inputting and displaying the specified customer profile, i.e. the types of consumers the advertising information should be provided to (by age group, gender, occupation, etc.), the type of advertising information (field day, bazaar, recital, sporting event, etc.), and the expiration date of the advertising information (the date on which the ad will stop being printed). Thus, ease of input is facilitated for the advertising customer, and this information can also be used for the convenience store to plan inventory.

Also, the information input terminal 111 is provided with an image scanner 115. The customer who is placing the ad can provide a drawing or the like to be printed on the receipt beforehand, and have this read in with the scanner 115 to form part or all of the ad. Further, the information input terminal 111 is provided with a floppy disk drive 117, and configured such that the customer who wishes to input the ad can read in image files (such as JPEG, gif, tif file) created at a remote site, e.g. home or office, as image data. Also, the printer 116 is controlled by CPU 112 to output the ad (input by the advertising customer) as a printed document for confirmation.

Further, in addition to input of advertising information, the information input terminal 111 can be used to make reservations and place orders for products such as concert tickets, compact disks, and so forth. The customer follows the instructions on the display 113, and operates the touch panel 114, thereby selecting the desired product or service. Once the selection is completed, the printer 116 prints a receipt.

The customer takes the stub, which the printer 116 has printed, to the cash register 131, and the operator thereof reads the bar-code printed on the stub, whereby the product such as concert tickets or compact disks can be paid for.

The input advertising information and product information is sent to the server via the interface 118.

Now, the information input terminal 111 functions as advertising information input controller or control means, and also serves as image input device or means in conjunction with the scanner 115 or floppy disk drive 117 (floppy including image file) provided with the information input terminal 111.

The configuration of server is described as follows.

Figure 3:
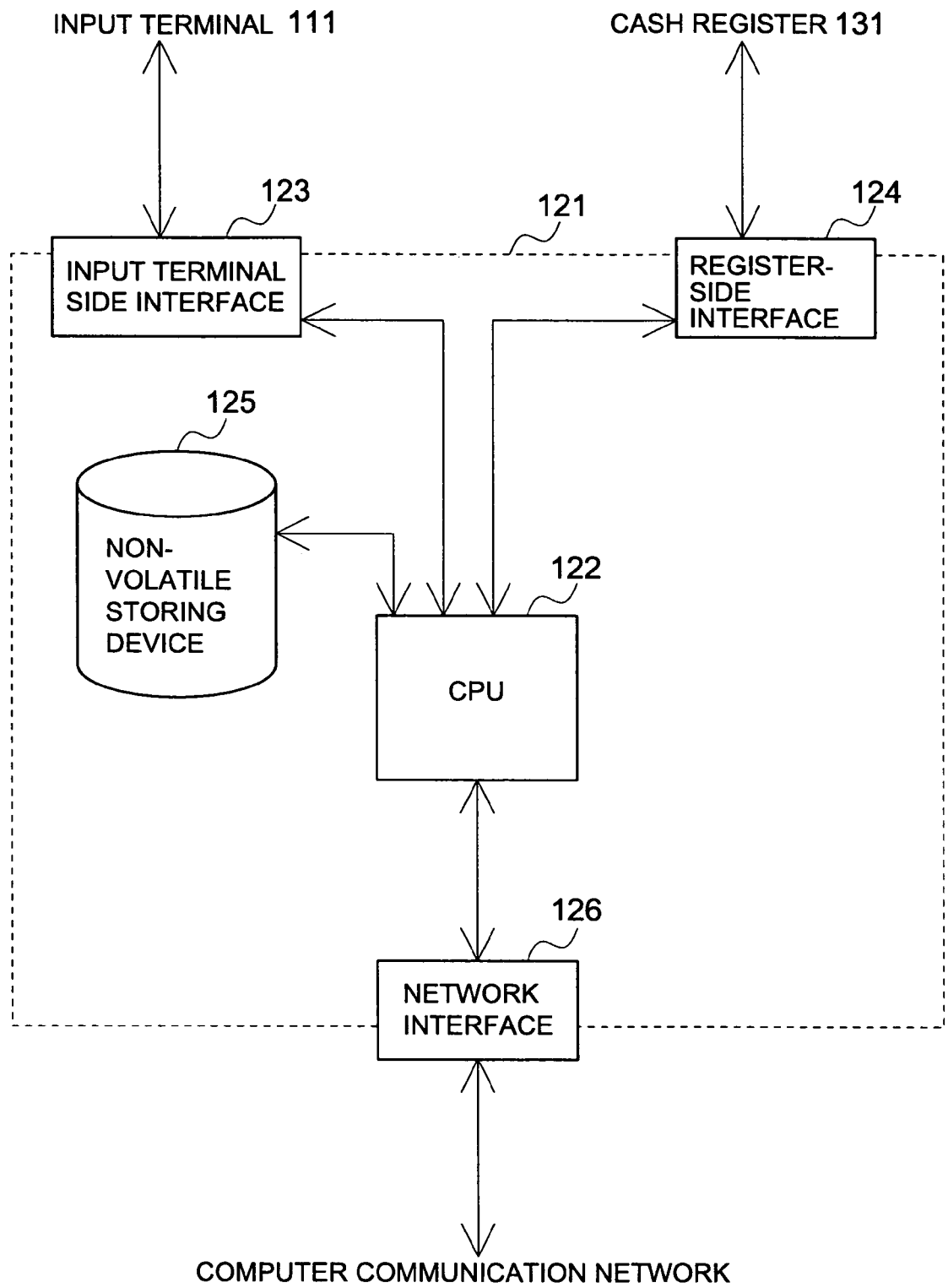
FIG. 3 is a block diagram illustrating the configuration of the server of the POS system shown in FIG. 1.

FIG. 3 illustrates a block diagram of the server 121 of the POS system shown in FIG. 1.

CPU 122 controls the components of the server 121. The server 121 communicates with the information input terminal 111 via the input terminal side interface 123, and communicates with the cash register 131 via the cash register side interface 124.

The server 121 receives transmission of the advertising information and target customer information that was input at the information input terminal 111 via the input terminal side interface 123, and stores these in a non-volatile storing device 125 such as a hard disk, DVD, MT.

The non-volatile storing device 125 also stores product databases. In this case, the CPU 122 receives transmission of product identification numbers (ID) transmitted from the cash register 131 via the cash register side interface 124, and transmits the price of the products to the cash register 131 via the cash register side interface 124.

The server 121 can connect to a computer communication network using telephone lines or the like via the network interface 126, thus reporting the state of sales of products to headquarters, retrieving inventory plans and updating information regarding changes in product prices, and also retrieving advertising information other than self-input from customers.

Also, the input advertising information can be checked, and information regarding the types and dates of various events to be held locally are sent to headquarters via the computer communication network allowing the plans for delivering products to the store to be changed to something more appropriate.

Here, the server 121 functions as the central control device of the POS system.

The configuration of the cash register is described as follows.

FIG. 4 is a block diagram of the cash register 131 of the POS system shown in FIG. 1.

CPU 132 controls the components of the cash register 131. The operator uses the bar-code reader 133, which is a hand-held scanner or the like, to read bar codes attached to products, or the key board 134 to input product identification information. Also, the operator inputs information, such as the age group, gender, occupation, etc., of the customer who is currently checking out, using the keyboard 134.

The price of the product is located in accordance the input product identification information, and is used for check-out information. Product databases stored in the server 121 may be used to locate the prices. The cash register 131 communicates with the server 121 via the interface 135.

The cash register 131 displays the name of the product that has been read from the bar-code, the price thereof, the total cost, etc., on the customer display 136. This enables the customer to confirm this information.

In addition, the cash register 131 can also be provided with a drawer 137 and a card reading device 138 for reading credit cards or prepaid cards. Thus, the check-out is executed.

The check-out information such as the product name, price, number, total cost, and change are printed as a receipt by the printer 139. The printer 139 is a high-speed ink-jet printer capable of multi-color printing.

Now, the information input from the keyboard 134 such as age group, gender, occupation, etc., regarding the customer who is checking-out and who is to receive the receipt with the ad, is sent to the server 121 via the interface 135.

The CPU 122 of the server 121 (FIG. 2) compares the information such as age group, gender, occupation, etc., of the customer who is to receive the receipt with printed ad, with the customer criteria stored in the non-volatile storing device 125, and selects the customer criteria that match. Further, advertising information corresponding to the matching customer criteria is retrieved from the non-volatile storing device 125, and this advertising information is transmitted to the cash register 131. In the event that multiple ads correspond to the matching customer criteria, one of the ads is selected for printing on the receipt.

The cash register 131 synthesizes or merges the received advertising information with the check-out information, and prints this on one receipt.

Here, the cash register 131 serves as a check-out information input controller or control means and printing controller or control means, and also cooperates with the server 121 to function as advertising information retrieving unit or means. Also, in the event that the cash register 131 serves as the printing unit or means, the product databases stored in the server 121 can be used to synthesize, create or merge check-out information.

The following describes the temporary registration of advertising information.

Figure 5:
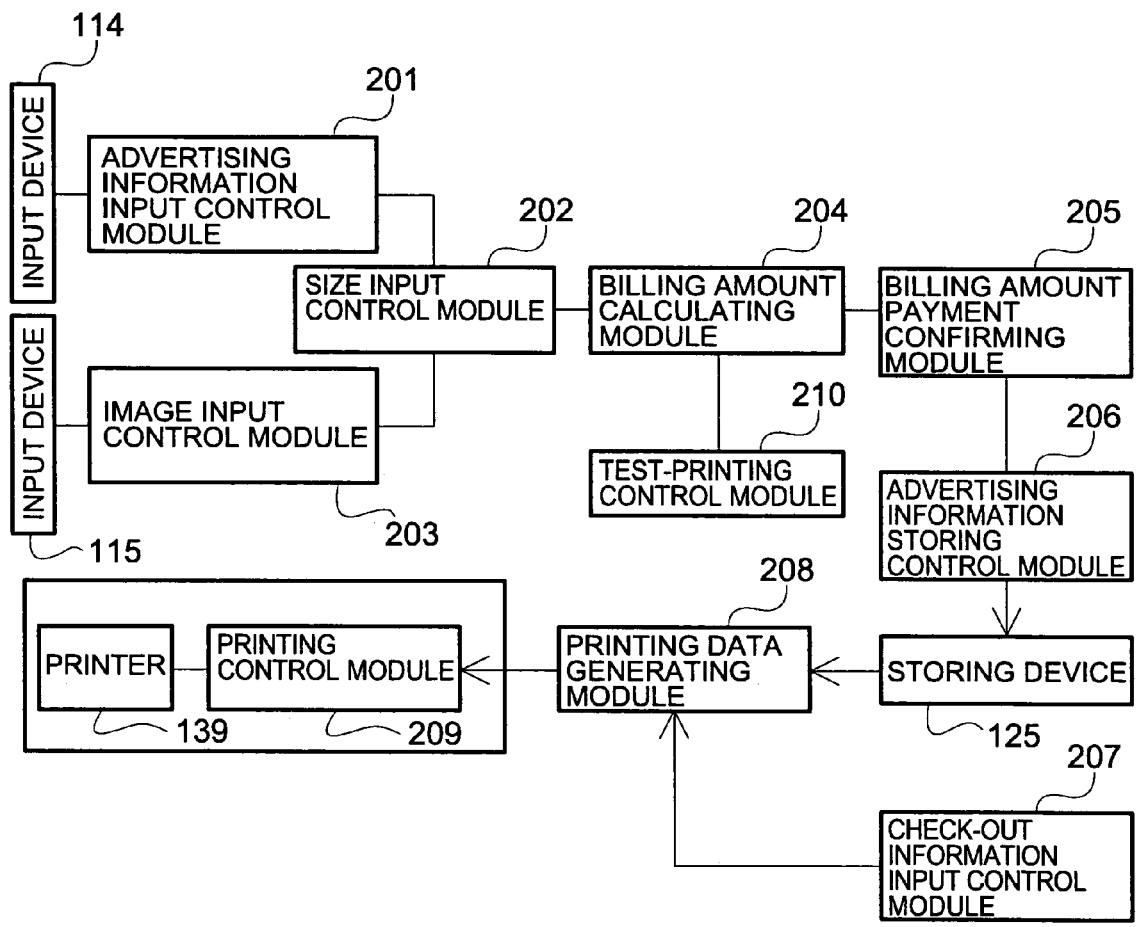
FIG. 5 is a function block diagram of the POS system according to the present invention.

FIG. 5 is a function block diagram of the POS system according to the present invention. Each of the functional units is shown and described as separate modules or blocks. Each of these modules may be embodied in software, firmware, discrete hardware components, ASICs, and the like, or combinations thereof. For example, these modules may be software modules resident on information input terminal 111, stored in ROM 117b and executed by CPU 112. Alternately, these modules may be software stored on a computer readable media, such as a floppy disk 117C, and loaded into information input terminal 111 through floppy disk drive 117 for execution by CPU 112 after temporary storage in RAM 117A.

The advertising information input control module 201 receives input from the input device 114 (touch panel of information input terminal 111) for inputting text data, inputs this advertising information to predetermined memory, i.e. RAM 117A within the information input terminal, and executes control through CPU 112 to temporarily save the same. Also, size input control module 202 for determining the size of the printed output of the advertising information is connected to this information input control module 201. Image input control module 203 is connected to the image scanner 115 which serves to input images, and is also connected to the size input control module 202. The input advertising information is temporarily saved in a storing device, e.g. RAM 117A within the information input terminal in an HTML format file or the like. Size input control module 202 and image input control module 203 can be included in information input control module 201, so that the information control module 201 controls the advertising information and added information.

The billing amount calculating module 204 calculates the charges for advertising, based on the printed output size of the input advertising information, or added information such as the duration of advertising, specified recipients of the ad, and so forth. In this case, a registration number and money due are printed on a ticket-like sheet by printer 116 provided on the information input terminal device 111, either in text or converted into a bar-code pattern, thus creating a registration card. Further, a button for specifying test printing is displayed on the touch panel 114. Actuation by the advertising customer activates the test printing control module 210, causing the ad to be printed by printer 116 in its actual size and format thereby allowing the customer to confirm, modify or cancel the ad.

Now, the advertising information input task is completed. The advertising information and the related information regarding the individual placing the ad and the intended recipients thereof are temporarily registered in the storing device 125 within the server 121.

The individual who wishes to run this ad takes the registration card to the cash register 131, where the information on the registration card is read in with a bar code reader 133 and the charges are paid by the customer. Payment through the cash register thus executes the billing amount payment confirmation. That is to say, the cash register functions as the billing amount payment confirming module 205. The advertising information storing control module 206 connected thereto receives transmission of this payment information, and finally registers the file of the advertising information, which has been temporarily saved, in the non-volatile storing device 125 in a readable form.

In the event that a store customer purchases a product and is ready to make payment at the cash register, the sum of the products is calculated by the check-out information input control module 207 and displayed on the display 136. Once payment is made by the customer, the printing data generating module 208, which may be executed by the server 121, synthesizes or combines the advertising information file appropriate to the customer's profile (age, gender, etc.) with the check-out information data according to a predetermined format, thus generating printing data. The printing data generating module 208 makes reference to the added information such as the age group, gender, etc., of the customer that has been input at the time of check-out information input. It compares this customer profile with the target customer profiles associated with each ad. In the event that the customer is judged to be in the target audience of an advertisement, the file of that advertising information is read out from the non-volatile storing device 125, and synthesized data (receipt with printed ad) is generated. In the event that more than one ad matches, then only one ad is printed. Any suitable priority scheme may be employed, such as printing the ad that had been printed the least from the group of matching ads.

The printing data is transmitted to the cash register 131 as data for printing the receipt, and is printed and output from the printer 139 by the printing control module 209.

Figure 6:
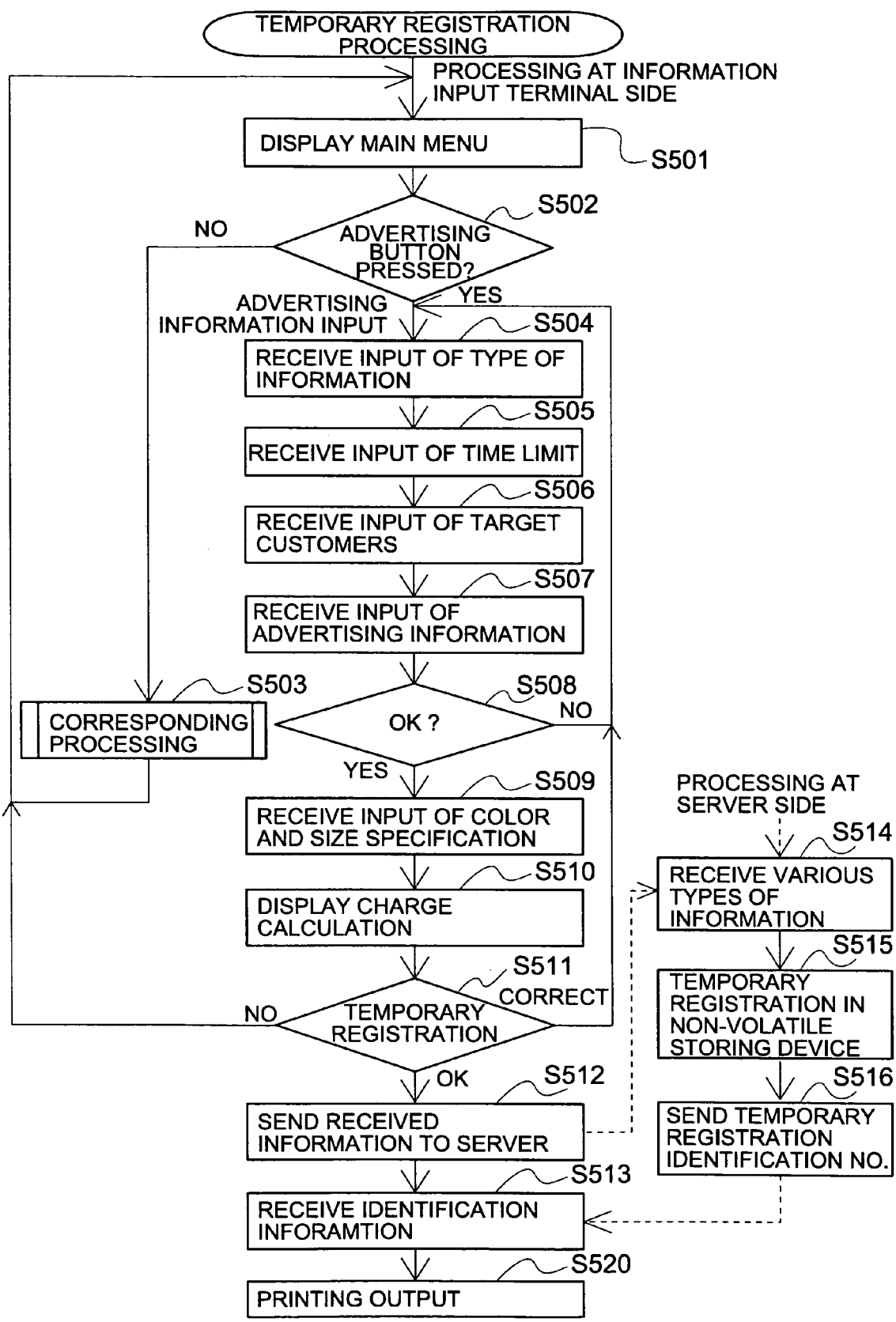
FIG. 6 is a flowchart illustrating the flow of the temporary registration process for advertising information which is executed at the information input terminal of the POS system shown in FIG. 1.

FIG. 6 is a flowchart illustrating the flow of the process to the point where advertising information is temporarily registered in the storing device of the POS system shown in FIG. 1.

Figure 7:
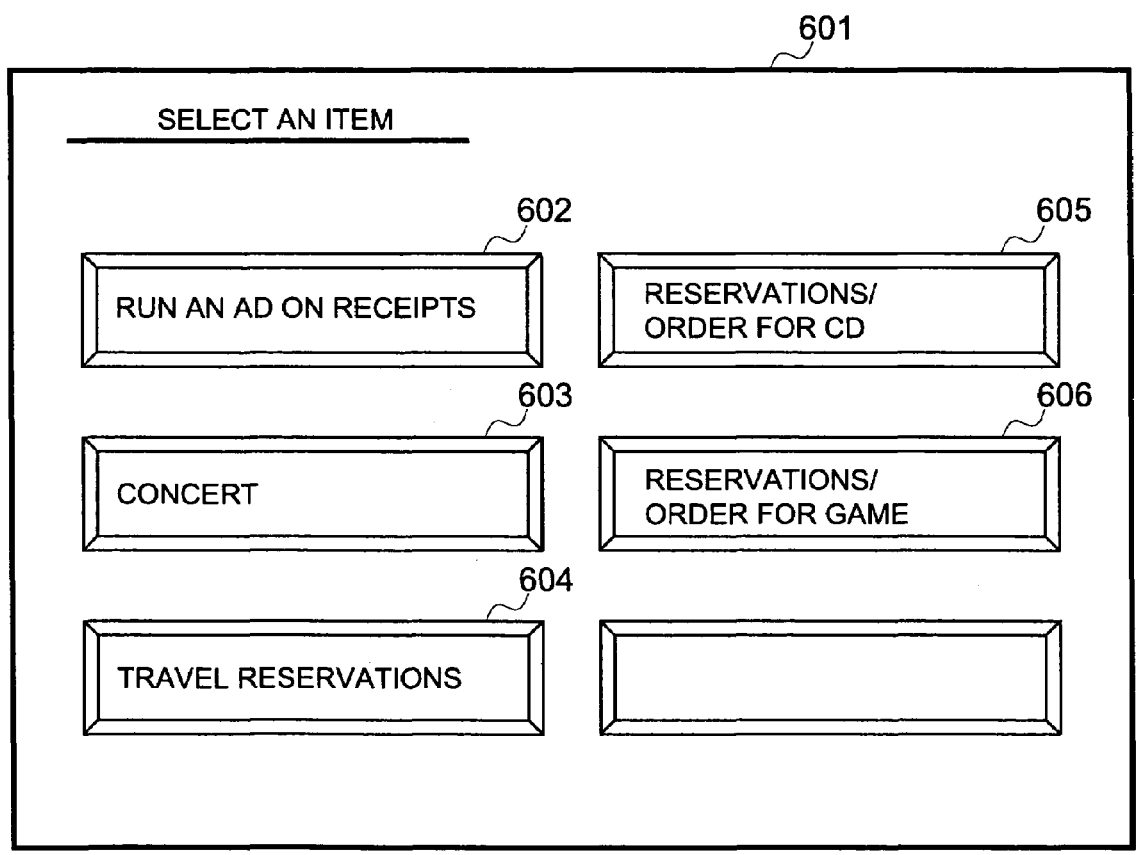
FIG. 7 is a display example of the main menu of the input screen displayed on the information input terminal of the POS system shown in FIG. 1.

First, the CPU 112 of the information input terminal 111 displays a main menu on the display 113 (step S501). FIG. 7 shows a display example of this main menu.

Displayed on the main menu 601 are an input button 602 for advertising information to be printed on receipts, a concert ticket reservation button 603, travel ticket or hotel reservation button 604, music CD ordering button 605, game software ordering button 606, etc.

Next, the CPU 112 monitors the touch panel 113 and checks which of the buttons displayed on the main menu 601 has been selected by the customer placing an ad (step S502).

In the event that a button other than the advertising information input button 602 has been selected (NO in step S502), a corresponding process specific to that button (e.g. hotel reservation processing) is executed (step S503), and the flow returns to step S501. The processing of step S503 can be carried out using known techniques, and a detailed description in not necessary for an understanding or appreciation of the present invention.

In the event that the advertising information input button 602 has been selected (YES in step S502; advertising information input), the CPU 112 displays an input menu for the type of advertising information on the display 113, and receives input of the type of advertising information (step S504).

Figure 8:
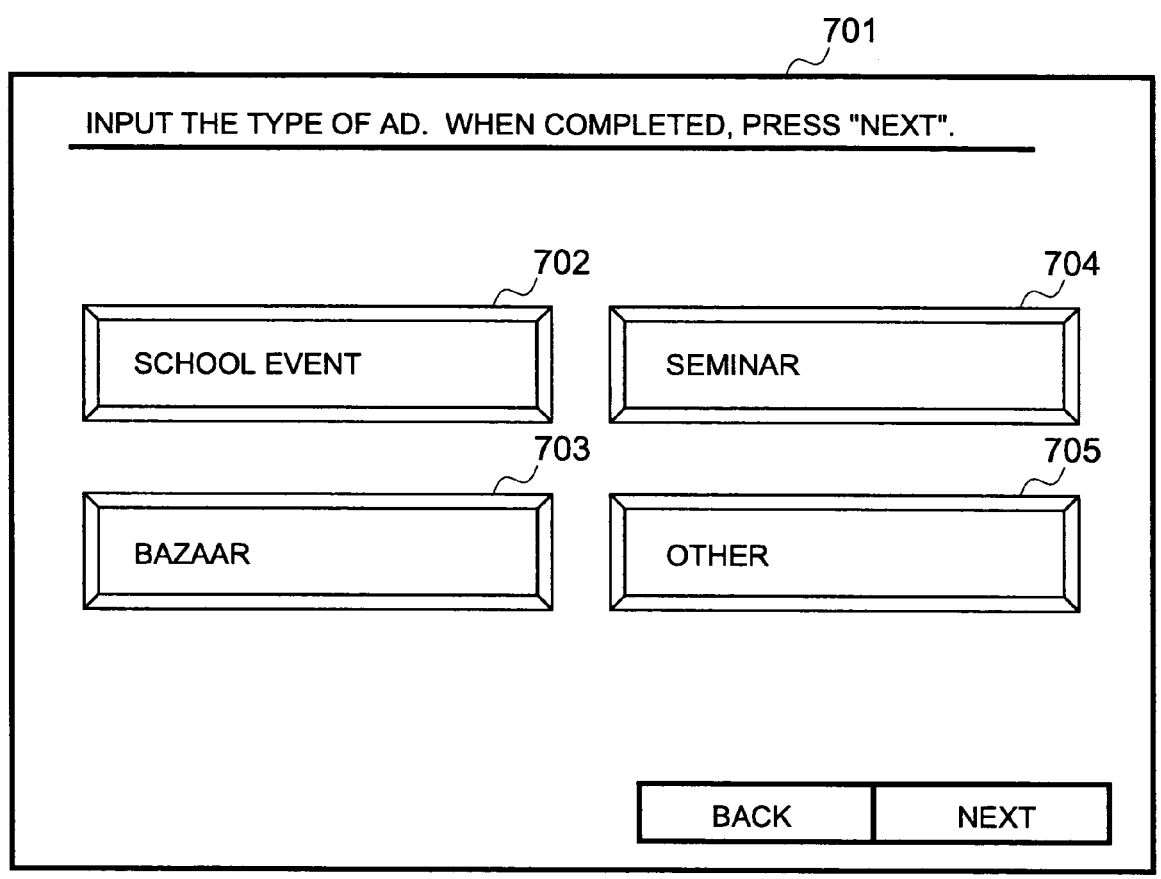
FIG. 8 is a display example of the input menu for the types of carried information displayed on the information input terminal of the POS system shown in FIG. 1.

FIG. 8 illustrates a display example of the input menu for type of advertising information.

The advertising information type input menu 701 displays a school event button 702, bazaar button 703, seminar button 704, an other button 705, etc. In the event that the customer placing the ad is notifying ad viewers of a cultural festival or field day, the school event button 702 is selected. In the event that the customer placing the ad is notifying ad viewers of a bazaar or flea market, the bazaar button 703 is selected. In the event that the customer placing the ad is notifying ad viewers of an ikebana (flower arrangement) class, language class, private tutor, etc., the seminar button 704 is selected. Also, in the event that the customer placing the ad is notifying ad viewers of an event that is not classified by the above, the other button 705 is selected.

Next, the CPU 112 displays an input menu for the expiration date of the advertisement on the display 113, thereby receiving input of the expiration date of the advertising information (step S505).

Figure 9:
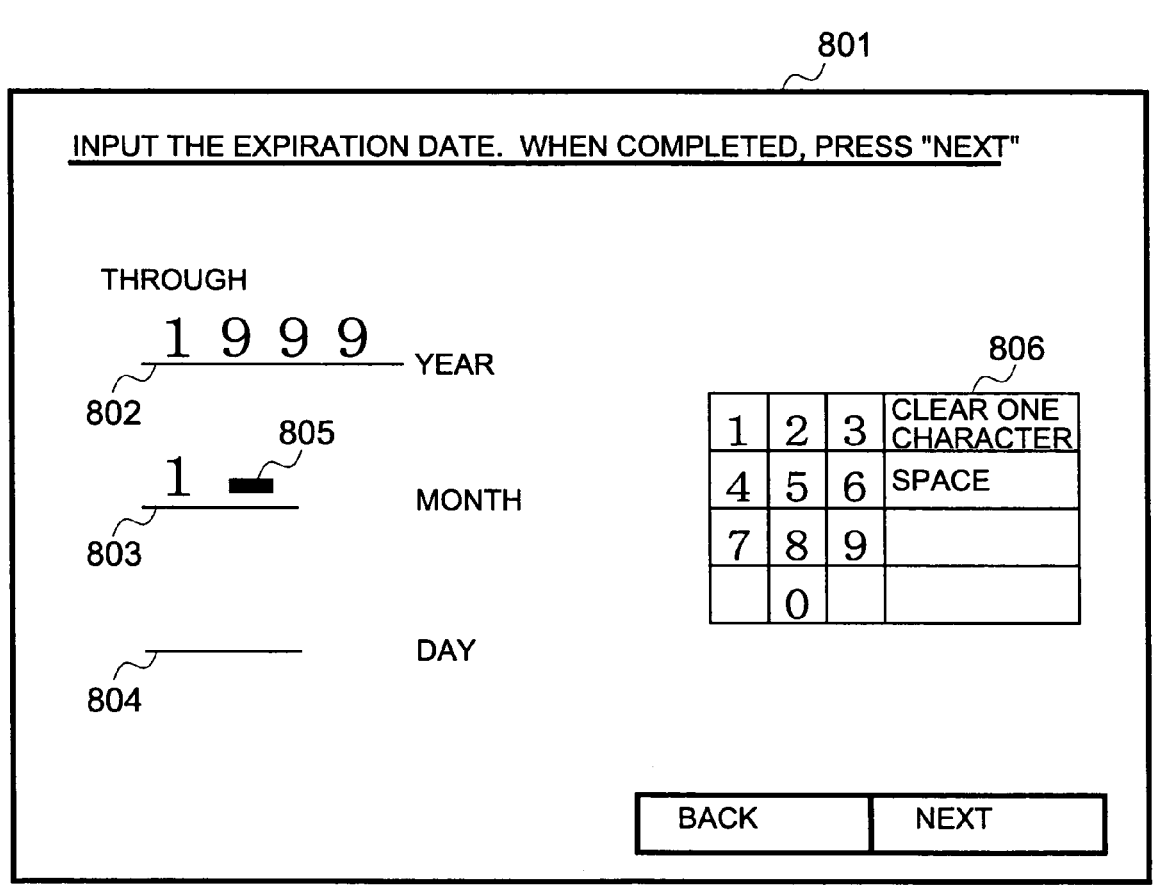
FIG. 9 is a display example of the input menu for the period of advertisement displayed on the information input terminal of the POS system shown in FIG. 1.

FIG. 9 shows a display example of the input menu for the expiration date of the advertising information. The customer who is placing the ad can input the date that an event or the like is being held so that the ad will expire on that date.

The expiration date input menu 801 has a year input portion 802, month input portion 803, and date input portion 804, for displaying the input year, month, and date, respectively, a cursor 805 for indicating the position where an input is currently being made, and a numerical keypad 806 for inputting numbers.

Further, the CPU 112 displays an input menu for the specified target customer group for the advertising information on the display 113, and receives the input of the specified groups for the advertising information (step S506).

FIG. 10 illustrates a display example of the input menu for the specified target customer groups for the advertising information.

The target customer group input menu 901 displays input buttons 902*a*, 902*b* for input of the gender of the individuals to which the information is to be provided, age group input buttons 903*a*, 903*b*, 903*c*, 903*d*, 903*e* and 903*f*, and occupation input buttons 904*a*, 904*b*, 904*c*, and 904*d*. The customer placing the ads can input the desired target groups by selecting the corresponding input buttons.

Next, the CPU 112 displays an input menu for the advertising information on the display 113, and receives the advertising information input (step S507).

Figure 11:
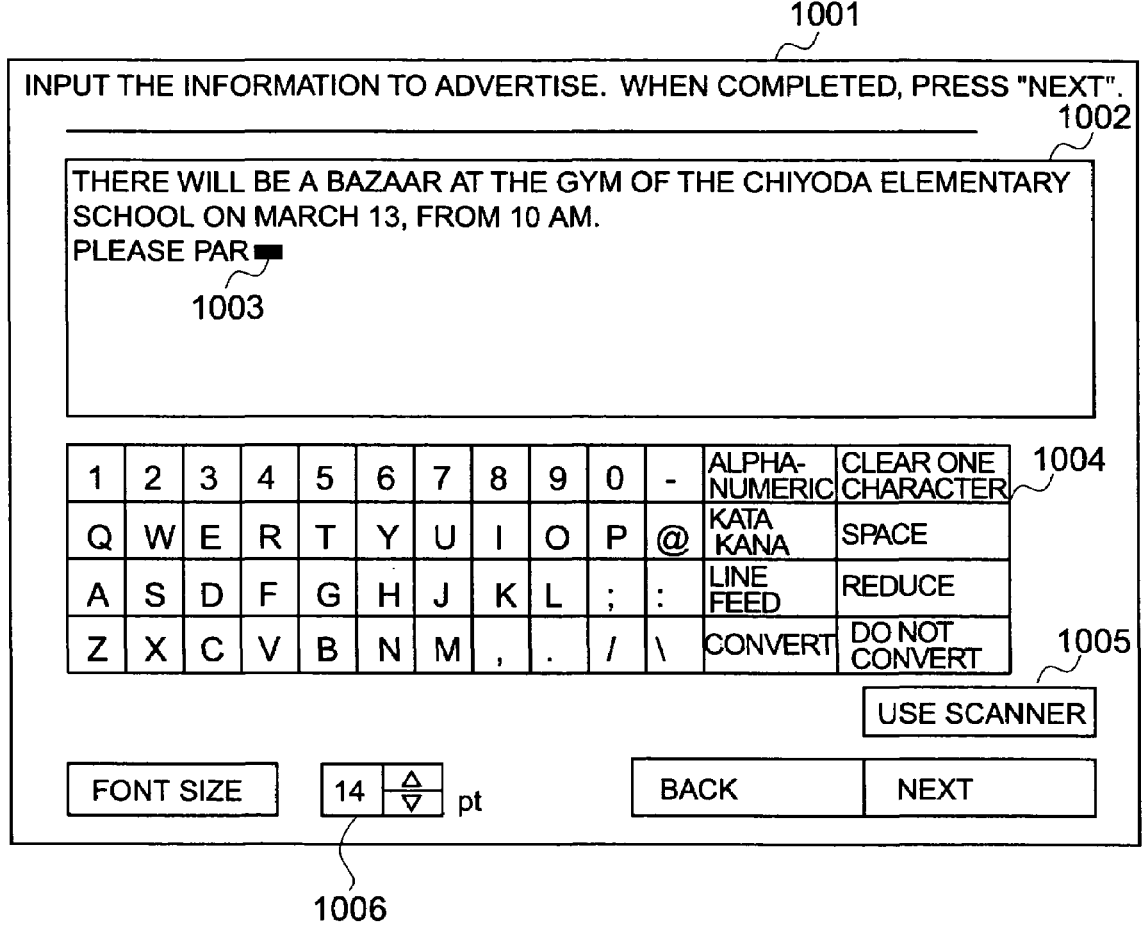
FIG. 11 is a display example of the input menu for the advertising information displayed on the information input terminal of the POS system shown in FIG. 1.

FIG. 11 illustrates a display example of the input menu for advertising information.

The advertising information input menu 1001 displays an input portion 1002 for displaying the advertising information that is input by the advertisement customer, a cursor 1003 for indicating the position at which input is currently being made, and a query table (keyboard) 1004 for input of any text. Further, a scanner button 1005 for reading images with the scanner 115 and using these images as advertising information is also displayed. The customer placing the ad can easily input the information to be provided, by operating the query table 1004 and scanner button 1005.

Also, desired font sizes can be specified with the font size specifying button 1006. Further, although not shown in the drawings, select buttons may be provided for the type of font, and the style thereof such as bold or italic, which can be specified for part or all of the information.

The CPU 112 displays a confirmation menu for confirming the information input in the steps S504 through S507, and the customer confirms the contents of the display information (step S508).

Figure 12:
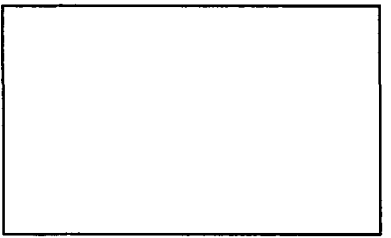
FIG. 12 is a display example of the confirmation menu displayed on the information input terminal of the POS system shown in FIG. 1.

FIG. 12 shows a display example of the confirmation menu. The confirmation menu 1101 displays advertising information type 1102, expiration date 1103, specified conditions 1104, advertising information 1105, and confirmation buttons 1106A and 1106B.

Though the present embodiment is described with reference to a method wherein image input is performed with an image scanner, an image file created on a home PC may be recorded on a floppy disk, and read out with this information input terminal, thereby creating advertising information data.

In the event of correcting the input (NO in step S508), the flow returns to step S504. When correcting or changing input, the previously input information can be used as already-set information in the various menus, thereby facilitating ease of correction.

Also, regarding the way in which input is made for this information, the procedures described above are examples only and may be modified, such as changing the order as appropriate, without departing from the spirit of the invention.

In the event that confirmation has been made (YES in step S508), the CPU 112 displays a temporary registration screen, and prompts the customer for confirmation of final registration.

Figure 13:
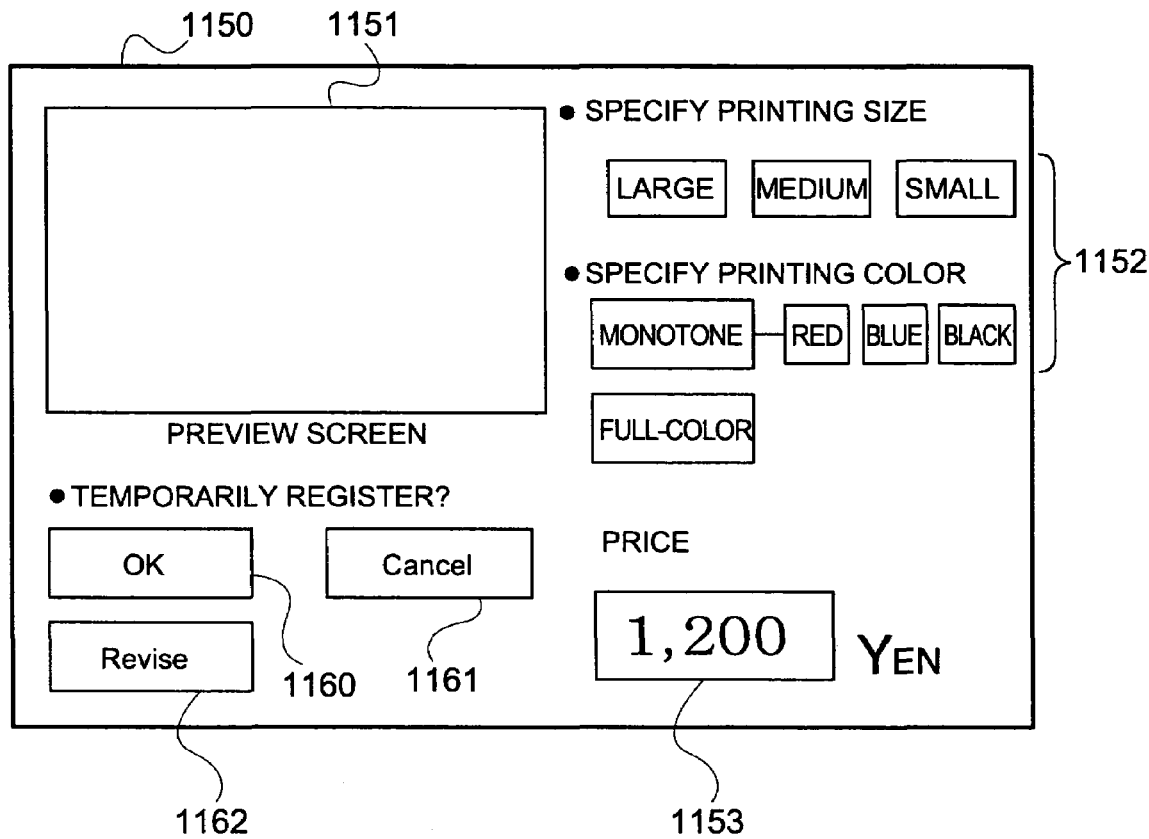
FIG. 13 is a display example of the registration confirmation menu displayed on the information input terminal of the POS system shown in FIG. 1.

FIG. 13 illustrates a display example of a registration confirmation menu. With the registration confirmation menu, a preview screen 1151, buttons 1152 for specifying printing size or printing color, a display screen 1153 for confirming charges, etc., are arrayed along with the final screen for temporary registration, in which a temporary registration button 1160, cancel button 1161, revise button 1162, and so forth are arrayed. In preview screen 1151, the same view that will appear as the printed image (ad) will be displayed when specified as one of the registration processes.

Using the above buttons, the size and color are specified (step S509), the charges are calculated based on the specification information such as the advertising period, size, etc. (step S510), and a query is made regarding whether the temporary registration is to be carried out (step S511). The billing amount can be retrieved by multiplying the number of days from the current date to the expiration date by a certain monetary amount. Also, the charges can be changed to predetermined amounts according to the type of the published information, such as 100 Yen for school events, 200 Yen for seminar notices, and so forth. Further, this may be changed according to the age of the customer placing the ad.

Now, pressing the OK button 1160 for temporary registration (YES in step S511) transmits the type of advertising information, expiration date, customer target group information, and advertising information (ad text/image) to the server 121 via the interface 118 (step S512). The ad text/image information and the additional information related to the ad (expiration date, customer target group, etc.) are correlated, and temporarily saved in the storing device 125 within the server. Also, pressing the cancel button 1161 deletes all information (NO in step S511). In the event that further corrections are necessary, the revise button 1162 is pressed. In this case, the flow returns to step S504.

The server 121 receives transmission of this information via the input terminal side interface 123 (step S514), and stores a temporary registration in the non-volatile storing device 125 (step S515). Then, the identification number of this temporary registration is transmitted via the input terminal side interface 123 (step S516).

The CPU 112 receives the transmission of the temporary registration identification number (step S513) via the interface 118. A bill also serving as a registration card is issued from the printer 116 of the information input terminal (step S520), and the process ends.

The customer placing the ad may print and output the format that he/she has specified, to confirm the size, color, font type, etc., of the ad. Also, a bar-code representing the temporary registration identification number is printed on the registration card.

In the billing process described below, this bar-code is read for billing.

The billing process is described as follows.

Figure 14:
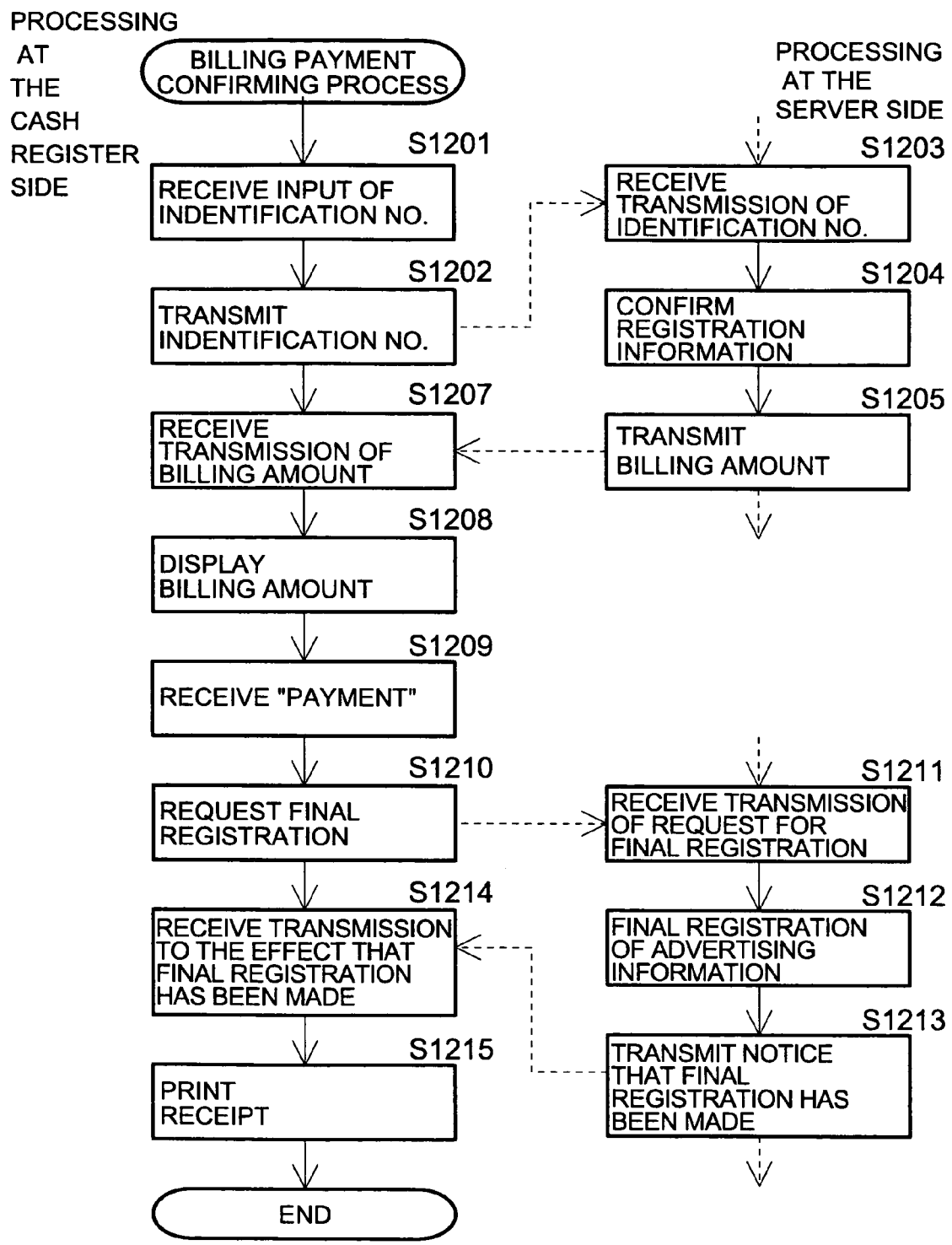
FIG. 14 is a flowchart illustrating the flow of the billing processing executed by a cash register and server of the POS system shown in FIG. 1.

FIG. 14 is a flowchart illustrating the flow for performing final registration of the temporarily registered advertising information, through payment of the billing amount being confirmed with the POS system shown in FIG. 1. This processing is initiated by the customer (who is placing the ad) handing the bill to the operator (employee) at the cash register 131. The bill also serves as a registration card that has been output in step S520.

First, the CPU 132 of the cash register 131 receives input of the temporary registration identification number from the bar-code reader 133 (step S1201). This input is carried out by the operator reading the bar-code printed on the registration card with a bar-code reader.

Next, the CPU 132 transmits this temporary registration identification number to the server 121 via the interface 135 (step S1202).

The server 121, upon receiving the temporary registration identification number via the cash register side interface 124 (step S1203), correlates the type of advertising information, expiration date, target customer groups, and advertising information, which has been temporarily registered and stored in the non-volatile storing device 125, with the contents of the registration card, and makes confirmation thereof (step S1204). Once the confirmation process ends, the billing amount calculated beforehand is transmitted to the cash register 131 (step S1205).

Also, the billing amount may be output in the bar-code on the registration card beforehand and used.

The cash register 131 receives transmission of the billing amount via the interface 135 (step S1207), and displays this billing amount on the display 136 (step S1208).

Now, the operator receives payment from the customer who is placing the ad, and presses a payment button on the keyboard 134, for example, whereby the cash register 131 receives acknowledgment that this billing amount has been paid (step S1209). The payment may be made by cash or by credit card or prepaid card using a card reading device 138.

Further, once payment of the billing amount is confirmed the CPU 132 requests the server to make final registration of the advertising information via the interface 135 (step S1210).

The server receives this request (step S1211), makes final registration of the advertising information (step S1212), and sends notice of the fact that final registration has been made to the cash register 131 via the cash register side interface 126 (step S1213).

The cash register 131, upon receiving notice of the fact that final registration has been made via the interface 135 (step S1214), prints a receipt for the customer placing the ad to the effect that the ad has been received (step S1215), and the process ends.

Check-out processing is described as follows.

Figure 15:
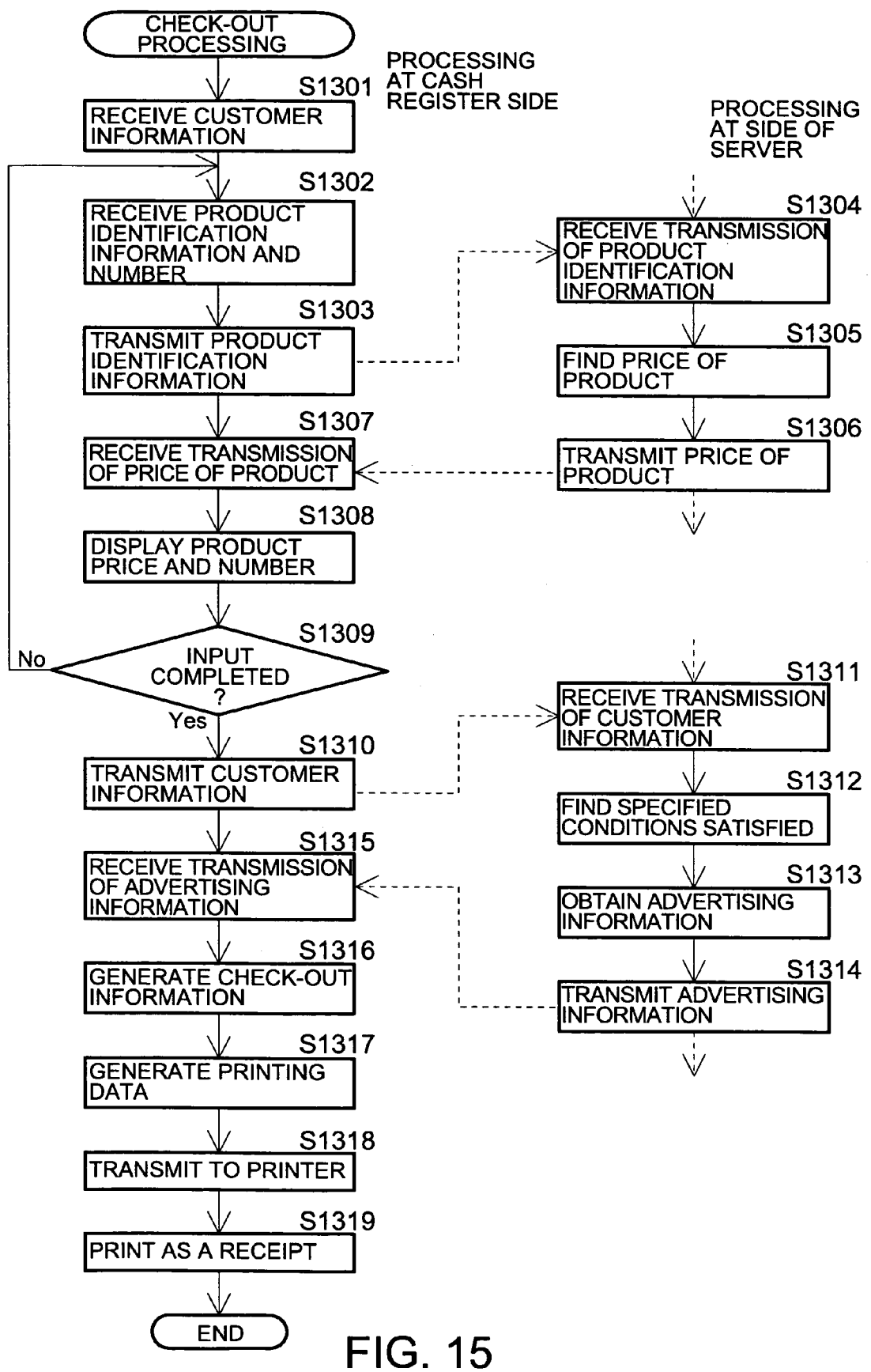
FIG. 15 is a flowchart illustrating the flow of the check-out processing executed by a cash register and server of the POS system shown in FIG. 1.

FIG. 15 is a flowchart illustrating the flow of processing from check-out information being input through the cash register and advertising information being printed on a receipt, in the POS system shown in FIG. 1.

First, the CPU 132 of the cash register 131 receives input information regarding the customer who is checking-out and who will receive the receipt with printed ad. This information includes gender, age group, occupation, etc. (step S1301), input through the keyboard 134. The operator (employee) at the cash register 131 performs this input.

Next, the CPU 132 receives product identification information input from the bar-code reader 133 and information regarding the number of products input from the keyboard 134 (step S1302), and transmits this identification information via the interface 135 to the server 121 (step S1303).

Upon receiving the product identification information via the cash register side interface 124 (step S1304), the server 121 finds the price of that product from the product database stored in the non-volatile storing device 125 (step S1305), and transmits this price information to the cash register 131 via the cash register side interface 124 (step S1306).

The cash register 131 receives transmission of the product price information via the interface 135 (step S1307), and the price information is displayed on the display 136 (step S1308).

Further, a check is made regarding whether or not input of product identification information is completed is made (step S1309). For example, input of product identification information is completed by the operator pressing the "total" button on the keyboard 134.

In the event that input of product identification information is not yet completed (NO in step S1309), the flow returns to step S1302. On the other hand, in the event that input of product identification information has been completed (YES in step S1309), the CPU transmits customer information received in step S1301 such as the gender, age group, occupation, etc., of the customer, to the server 121 via the interface 135 (step S1310).

The server 121 receives the transmission of customer information such as the gender, age group, occupation, etc., of the customer (step S1311) via the cash register side interface 124. The CPU 122 compares this customer information with the customer target group information registered in the non-volatile storing device 125, and determines which ads (with specified customer target groups) match the customer who is checking out (step S1312).

Incidentally, in the event that there are multiple ads (with specified customer target groups) that match, one of the ads is selected randomly or according to a priority scheme such as the number of times previously printed on receipts, etc.

Also, certain default ads/customer target groups may be stored and registered in the non-volatile storing device 125 beforehand so that if no customer-purchased ad matches, then a store ad, for example, will be printed.

Next, the CPU 122 retrieves the matching advertising information from the non-volatile storing device 125 (step S1313), and transmits this advertising information to the cash register 131 via the cash register side interface 124 (step S1314).

The cash register 131 receives advertising information via the interface 135 (step S1315).

Next, the CPU 132 of the cash register 131 generates check-out information to be printed on the receipt, from the number of products received in step S1302, and the product price information received in step S1307 (step S1316).

Finally, the cash register 131 generates printing data by synthesizing or combining the advertising information received in step S1314 with the check-out information generated in step S1315 (step S1317), transfers this to the printer (step S1318) and prints this as a receipt from the printer 139 (step S1319), thus completing the processing. Regarding the printing format, synthesizing methods include preparing or dedicating a printing area for advertising on the receipt, and the advertising information is formatted and printed in this area. Alternately, the advertising information is printed first on the receipt and the check-out information is printed following the ad. Further, in the event that multiple ads are registered, only the titles may be printed on receipts for customers who do not match any of the customer target groups.

FIG. 16 is an explanatory diagram showing an example of a receipt printed according to the present invention. The receipt 1401 is divided into an advertising information printing area 1402 and a check-out information printing area 1403, each including the appropriate printed information.

The forgoing procedures illustrate one example of an embodiment of the present invention. These procedural steps may be altered or their order and execution may be changed with equivalent processing. For example, though omitted in the above description, steps may be added as appropriate to this process for calculating change, correcting input information, and so forth.

Also, the information input terminal 111 and the server 121 may be configured integrally, or the server 121 and the cash register 131 may be configured integrally. Further, the processing performed at the server 121 may be performed at the cash register 131, or vice versa. Such embodiments are also encompassed in the scope of the present invention.

Also, with the above embodiment, the billing amount is calculated by the type of advertising information and the number of days until the expiration date, but other methods may be applied, as well.

For example, an arrangement may be made such that the advertiser can input at the information input terminal 111 how many receipts the ad should be printed on, wherein the billing amount is calculated by multiplying this number by a charge per receipt. In this case, the ad will be printed on receipts when a customer matches the customer target group specified as long as the number of printed ads remains at or below the number paid for.

Further, the period for carrying the ad can be specified in greater detail. For example, the advertiser may specify a time and duration range such as "between 10 AM to 2 PM, for two weeks starting today". In this case, the number of customers receiving the ad may differ by time range, so the advertising charges may be varied.

Also, in the above embodiment the advertising fees are prepaid before the ad is registered. But, in the case of using a credit card or the like, an arrangement can be realized wherein billing is made later according to the number of receipts actually printed with ads. In this case, inputting the credit card number from the cash register changes the status from temporary registration to final registration.

Also, instead of inkjet printer 116, a thermal printer, impact dot printer or laser printer can be used. If the printer 116 cannot print in color, color buttons (FIG. 13) are ignored.

As described above, the present invention exhibits the following advantages.

First, a POS system and advertising billing method is provided wherein a customer who desires to place an ad is billed according to the characteristics of the ad (size, duration, etc.). In the event that the customer pays the billed amount, the information is printed as an advertisement on the receipt of another customer.

Also, a POS system and advertising billing method is provided wherein inputting of the advertising information is easy for the customer.

Also, a POS system and advertising billing method is provided wherein advertising information to be provided on receipts can be directed to the most appropriate customers selected according to the age group, gender, occupation, etc.

Further, an information recording medium storing a program can be easily distributed or sold independently from the POS system hardware, as a software product. Executing the program recorded in the information recording medium according to the present invention on a POS system realizes the POS system and POS system control method according to the present invention.

While the invention has been described in conjunction with several specific embodiments, it is evident to those skilled in the art that many further alternatives, modifications and variations will be apparent in light of the foregoing description.

Thus, the invention described herein is intended to embrace all such alternatives, modifications, applications and variations as may fall within the spirit and scope of the appended claims.

What is claimed is:

1. A POS system comprising:
a scanner that reads an image;
an advertising information input controller that receives advertising information, the advertising information including the image read by the scanner;
a customer information input unit that inputs characteristics of an advertising recipient, the characteristics including at least one of gender, age, and occupation;
a billing amount calculator that calculates a billing amount based on the advertising information received by the advertising information input controller;
a payment confirming unit that detects if payment of the billing amount has been completed;
a storing device;
an advertising information storing controller that stores the advertising information in the storing device in response to the payment confirming unit detecting that payment of the billing amount has been completed;
an advertising information sending unit that sends the advertising information to a printing device;
a check-out information input controller that receives check-out information;
an advertising information retrieving unit that retrieves advertising information stored in the storing device;
a printing data generator that synthesizes the check-out information received by the check-out information input controller with the advertising information retrieved by the advertising information retrieving unit, and that generates printing data to be printed as a receipt with the advertising information, wherein generating the printing data to be printed as a receipt with the advertising information is in response to the payment confirming unit detecting that payment of the billing amount has been completed; and
a printing controller that prints the generated printing data according to a predetermined format.

2. A POS system according to claim 1, further comprising:
a size input controller that specifies a size of an advertisement containing the advertising information;
and the billing amount calculator being responsive to the size input controller to calculate the billing amount based on the specified size.

3. A POS system according to claim 1, comprising a disk drive that stores image files and the advertising information input controller receiving the image files as advertising information from the disk drive.

4. A POS system according to claim 3, wherein the disk drive comprises a floppy disk drive.

5. A POS system according to claim 1, comprising a multi-color printer that receives the advertising information from the advertising information sending unit and prints the advertising information in at least two colors.

6. A POS system according to claim 1, comprising a size input controller that specifies a size of an advertisement containing the advertising information and wherein the printing data generator generates the printing data based on the specified size.

7. A POS system according to claim 1, wherein the check-out information input controller receives the characteristics of the advertising recipient from the customer information input unit;
and wherein the advertising information retrieving unit selects one advertising information item from a plurality of advertising information items stored in the storing device, based on characteristics of the advertising recipient received by the check-out information input controller.

8. A POS system comprising:
an information input terminal;
a server;
and a cash register;
wherein the information input terminal includes:
a scanner that reads an image;
a display that displays an input menu and a confirmation menu;
an input device that receives advertising information and a confirmation input, the advertising information including the image read by the scanner;
a terminal CPU that transmits the advertising information to the server;
wherein the server includes:
an input terminal side interface that receives the advertising information from the information input terminal, and that transmits an ID to the information input terminal;
a non-volatile storing device that stores the advertising information;
wherein the information input terminal further includes:
a printer that prints the advertising information and a barcode that represents the ID;
wherein the cash register includes:
a customer information input unit that inputs characteristics of an advertising recipient, the characteristics including at least one of gender, age, and occupation;
a barcode reader that reads the barcode that is printed by the printer;
a register CPU that transmits the ID to the server,
wherein the server further includes:
a calculating module that calculates a billing amount;
a server CPU that transmits the billing amount to the cash register;
wherein the cash register further includes:
a display that displays the billing amount;
a billing amount payment confirming module that confirms a payment;
the register CPU being responsive to the billing amount payment confirming module confirming a payment for transmitting to the server that the advertising information is to be registered.

* * * * *